No. 792,075. PATENTED JUNE 13, 1905.
J. C. RAYMOND.
VEHICLE TIRE.
APPLICATION FILED DEC. 9, 1904.
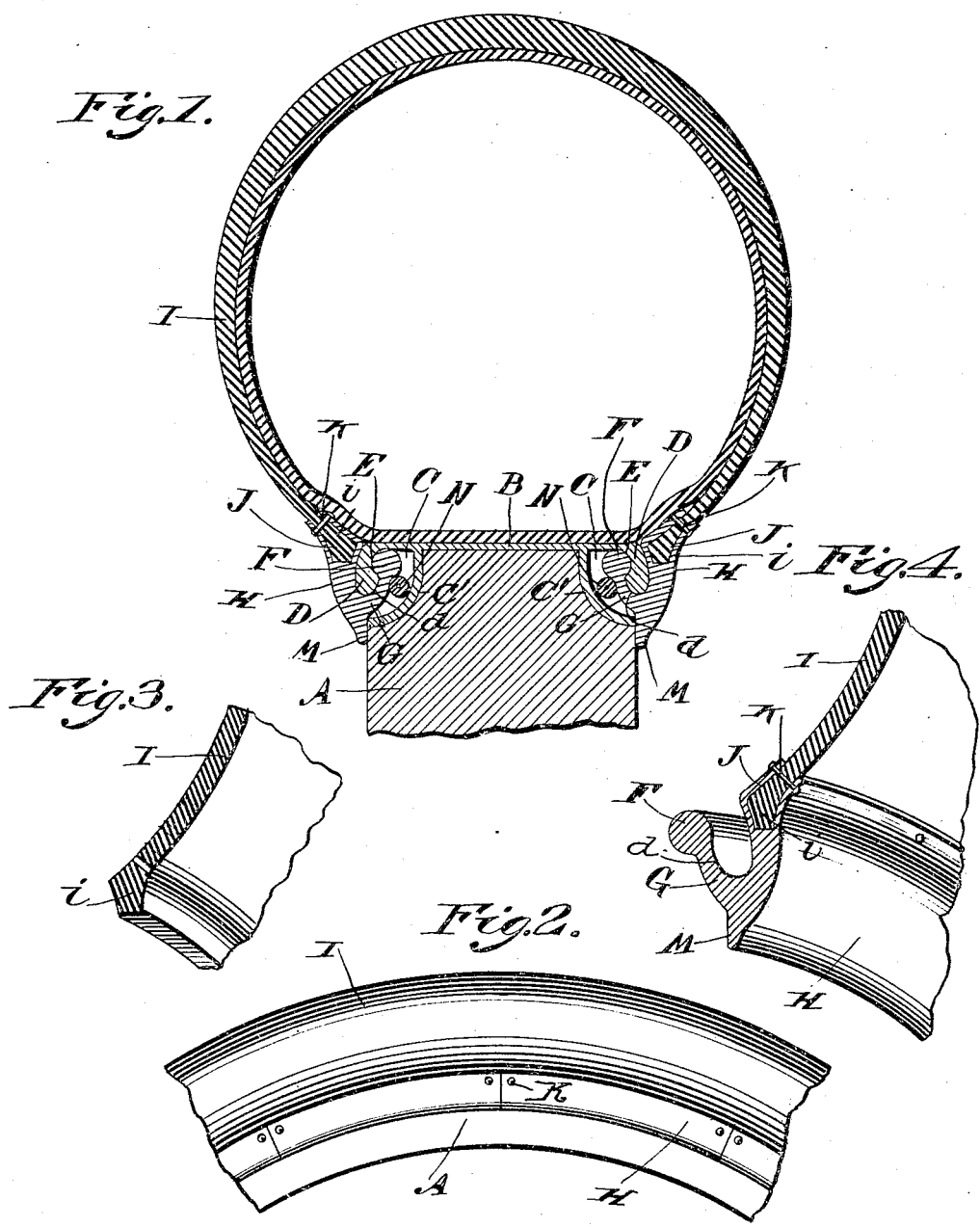
WITNESSES:
INVENTOR
John C. Raymond.
BY
ATTORNEYS No. 792,075. Patented June 13, 1905.

UNITED STATES PATENT OFFICE.

JOHN C. RAYMOND, OF NEW YORK, N. Y.

VEHICLE-TIRE.

SPECIFICATION forming part of Letters Patent No. 792,075, dated June 13, 1905.

Application filed December 9, 1904. Serial No. 236,120.

*To all whom it may concern:*

Be it known that I, JOHN C. RAYMOND, a citizen of the United States, residing at New York, borough of Manhattan, in the county of New York and State of New York, have made certain new and useful Improvements in Vehicle-Tires, of which the following is a specification.

My invention is an improvement in tires for use on automobiles and the like; and the invention consists in certain novel constructions and combinations of parts, as will be hereinafter described and claimed.

In the drawings, Figure 1 is a cross-sectional view of a portion of a wheel embodying my invention, parts being broken away. Fig. 2 is a side view of a portion of the wheel. Fig. 3 is a detail perspective view of a portion of the tire-casing, and Fig. 4 is a detail perspective view showing a portion of the tire-casing and one of the edge sections to which the tire-casing is secured.

As shown, the rim A of the wheel has the rim-plate B, which is fitted and secured on the outer side of the rim A and is provided at its opposite edges with the circumferential channels C, having at their outer sides the inwardly-projecting hooks D, provided at their inner sides with the enlargements or ribs *d*, forming the circumferential recesses E, in which fit the rounded heads F on the hooks G of the edge sections H.

The tire I is provided at its opposite edges with the edge sections H, the latter being preferably provided in their outer ends with the sockets J, in which are fitted the edges of the tire I, such edges being enlarged at *i* and fitting in correspondingly-enlarged portions at the base of the sockets J, as shown in Fig. 1, in order to prevent the detachment of the tire from the edge sections H in case the rivets K should become loosened at any time.

The edge sections H are provided with the hook-like portions G, conformed on their inner faces to the hooks D of the rim-plate B, having the enlarged heads F to engage in the recesses E and provided with the projecting heel portions M, which lap alongside the rim A and form stops to prevent any outward movement of the edge sections beyond the desired position, as shown in Fig. 1.

In order to hold the enlarged head F of the hook G in engagement with the hook D of the rim-plate, I prefer to provide the spring-rings N, arranged within the channel C and to bear between the base-plate C' of said channel and the hook G immediately below the enlarged head F, as shown in Fig. 1. In forcibly inserting the hook G and in removing the same the spring N will yield for the passage of the head F; but it will be understood that if in case of punctures the tire I should collapse the spring N will prevent the hook G from becoming disengaged with the hook D of the rim-plate and will maintain the parts in the desired relation until the puncture can be repaired. It will be understood the springs N may be in the form of rubber tubing and suitably secured to the rim-plate in the use of the invention.

In practice I prefer to make the edge sections H in short lengths of, say, several inches, as will be understood from Fig. 2, to facilitate their application to and removal from engagement with the hooks of the rim-plate.

The invention is simple, easily constructed, and permits the ready application of the tire to the rim of a wheel.

In practice I prefer to employ an inner tube within the tire, as is common in devices of this class.

Having thus described my invention, what I claim as new, and desire to secure by Letters Patent, is—

1. The combination substantially as herein described of the rim-plate provided at its opposite edges with the circumferential channels and with the inwardly-projecting lugs provided at their inner sides with the enlargements or ribs, and the base-plate of the channel being located opposite the inner sides of said hooks, the tire having at its edges enlarged portions, the edge sections provided in their outer edges with sockets to receive the edges of the tire and enlarged at their inner ends to conform to the enlarged edges of said tire, said sections being provided with the inwardly-projecting hook portions having the enlarged heads for engagement with the hooks of the rim-plate and having at their outer sides the heels projecting alongside the rim of the wheel, and the springs arranged within the channels of the rim-plate and bearing between the base-walls of said channel and the hooks of the edge section adjacent to the heads of the latter whereby to secure said heads in interlocked engagement with the hooks of the rim-plate substantially as set forth.

2. The combination with the rim of the wheel and inwardly-projecting hooks overhanging channels at the sides of the wheel, the tire, and the edge sections connected with the tire and having hooks projecting into the channels and engaging the hooks of the wheel-rim and also provided with heels projecting alongside the rim substantially as set forth.

3. The combination with the rim and the hooks in connection therewith, of the tire having the edge sections provided with the hooks engaging with those of the rim and with the heel portions projecting alongside the rim, and the springs for holding the hooks of the edge sections in connection with those of the rim, substantially as set forth.

4. The combination with the rim-plate provided at its edges with the circumferential channels and with the hooks overlying the same and provided at their inner sides with enlargements or ribs, the tire and the edge sections of the tire having the returned hooks headed for engagement with the hooks of the rim-plate and also provided with the heels overlapping the rim, and the springs within the circumferential channels and pressing the hooks of the edge sections into engagement with those of the rim substantially as set forth.

5. A tire provided at its free edges with hooks turned within the tire and projecting outwardly toward the circumference of the tire to engage with inwardly-turned hooks on a wheel-rim and with heel projections at the outer side of the tire to overlap said rim, substantially as set forth.

6. A tire having the edge sections provided with a returned hook to engage with a hook on the rim of a wheel and with a heel projection to overlap said rim, in combination with the rim-plate having a hook for engagement with that of the edge sections, and a spring for pressing said hooks into interlocking engagement with each other, substantially as set forth.

7. The combination of the rim, the rim-plate provided at its edges with circumferential channels and with base-plates at the inner sides thereof and with hooks overhanging the channels and enlarged at their inner sides, the tire, the edge sections socketed at their outer sides to receive the edges of the tire and provided with hooks having enlarged heads to engage with the hooks on the rim-plate and with heels lapping alongside the rim, and the spring within the channel and pressing the hooks of the edge section into engagement with the hooks of the rim-plate, substantially as set forth.

8. The combination with the wheel-rim provided at its opposite sides with the inwardly-turned hooks and the tire provided at its free edges with returned hooks turned within the tire and projecting outwardly toward the circumference of the tire and engaged with said hooks of the rim, and also having heel projections at the outer side of the tire and extending inwardly and overlapping said rim, substantially as set forth.

JOHN C. RAYMOND.

Witnesses:
SOLON C. KEMON,
PERRY B. TURPIN.